US011059069B2

(12) United States Patent
Ikushima

(10) Patent No.: US 11,059,069 B2
(45) Date of Patent: Jul. 13, 2021

(54) LIQUID MATERIAL-DISCHARGING DEVICE

(71) Applicant: MUSASHI ENGINEERING, INC., Mitaka (JP)

(72) Inventor: Kazumasa Ikushima, Tokyo (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 0 days.

(21) Appl. No.: 16/331,353

(22) PCT Filed: Sep. 8, 2017

(86) PCT No.: PCT/JP2017/032395
§ 371 (c)(1),
(2) Date: Mar. 7, 2019

(87) PCT Pub. No.: WO2018/056072
PCT Pub. Date: Mar. 29, 2018

(65) Prior Publication Data

US 2019/0358664 A1 Nov. 28, 2019

(30) Foreign Application Priority Data

Sep. 20, 2016 (JP) ............................ JP2016-183247

(51) Int. Cl.
*B05C 5/02* (2006.01)
*B05C 11/10* (2006.01)
(Continued)

(52) U.S. Cl.
CPC ......... *B05C 5/0237* (2013.01); *B41J 2/04588* (2013.01); *B05C 5/001* (2013.01);
(Continued)

(58) Field of Classification Search
CPC ....... B05C 5/0237; B05C 5/001; B05C 11/10; B41J 2/04588; B41J 2202/05; B05D 1/26
(Continued)

(56) References Cited

U.S. PATENT DOCUMENTS 4,350,187 A * 9/1982 Trusselle ................ B67C 3/001 134/198
4,459,029 A 7/1984 Veyriere
(Continued)

FOREIGN PATENT DOCUMENTS

JP 2002-326715 A 11/2002
WO 2008/126373 A1 10/2008

OTHER PUBLICATIONS

Supplementary Search Report dated Apr. 29, 2020, issued in counterpart EP Application No. 17852849.3 (1 page).

*Primary Examiner* — Michael J. Melaragno
(74) *Attorney, Agent, or Firm* — Westerman, Hattori, Daniels & Adrian, LLP

(57) ABSTRACT

A liquid material discharge device includes a discharge member made of a rod-shaped body, a liquid chamber which is wider than the discharge member and in which a tip portion of the discharge member is disposed, a discharge port in communication with the liquid chamber, a liquid feed path establishing communication between the liquid chamber and a liquid material storage container, a drive device driving the discharge member, and a main body. The liquid material discharge device further includes an elongate insert member that is removably inserted into the liquid feed path without cutting the communication between the liquid chamber and the liquid material storage container.

21 Claims, 11 Drawing Sheets

(51) Int. Cl.
*B41J 2/045* (2006.01)
*B05C 5/00* (2006.01)
*B05D 1/26* (2006.01)

(52) U.S. Cl.
CPC ................ *B05C 11/10* (2013.01); *B05D 1/26* (2013.01); *B41J 2202/05* (2013.01)

(58) Field of Classification Search
USPC ......................... 222/504, 252, 263, 148, 149
See application file for complete search history.

(56) References Cited

U.S. PATENT DOCUMENTS 5,277,344 A * 1/1994 Jenkins ................. B05C 5/0225 222/504
5,341,844 A * 8/1994 Wass ....................... F16K 1/305 137/613
5,467,899 A * 11/1995 Miller ................. B05C 11/1034 222/309
6,253,957 B1 * 7/2001 Messerly ................ B05C 5/001 222/1
6,267,266 B1 * 7/2001 Smith ..................... B05C 5/001 222/1
6,450,416 B1 9/2002 Berg et al.
6,761,290 B2 * 7/2004 Righolt ..................... B05C 5/02 222/504
7,121,287 B2 * 10/2006 Carhuff ................. B08B 9/0321 134/169 R
7,134,617 B2 * 11/2006 Ikushima ................ B05B 1/083 239/584
8,448,818 B2 * 5/2013 Ikushima ............ B05C 11/1034 222/1
8,763,860 B2 * 7/2014 Ikushima ............... B67D 7/428 222/135
8,807,400 B2 * 8/2014 Ikushima ............ B05C 11/1034 222/504
9,016,598 B2 * 4/2015 Ikushima .............. B05B 9/0409 239/264
9,156,054 B2 * 10/2015 Ikushima ................ B05B 12/06
9,260,234 B2 * 2/2016 Ikushima ............ B05C 11/1034
9,393,787 B2 * 7/2016 Ikushima ................ B05B 12/06
9,441,617 B2 * 9/2016 Kazumasa .............. F04B 9/105
9,701,143 B2 * 7/2017 Ikushima ................ B05B 12/06
9,889,463 B2 * 2/2018 Ikushima ............ B05C 11/1034
9,919,336 B2 * 3/2018 Ikushima ............ B05C 11/1034
10,300,505 B2 * 5/2019 Aguilar ................. B05C 5/0225
2004/0134996 A1 * 7/2004 Kazumasa .............. B05B 1/083 239/11
2005/0061391 A1 * 3/2005 Ikushima .................. B05C 5/02 141/2
2005/0063839 A1 * 3/2005 Kazumasa ............ B05C 5/0225 417/415
2005/0067438 A1 * 3/2005 Ikushima .............. B05C 5/0225 222/386
2006/0093493 A1 5/2006 Maruyama et al.
2007/0227227 A1 * 10/2007 Ikushima ............ B05C 11/1002 73/1.74
2007/0264425 A1 * 11/2007 Kubo ................... G02B 6/3612 427/163.2
2009/0101669 A1 * 4/2009 Hassler, Jr. ............. B05C 5/001 222/1
2010/0103229 A1 * 4/2010 Ikushima ............. B41J 2/16508 347/85
2010/0156970 A1 * 6/2010 Ikushima ................ B05B 12/06 347/8
2010/0175759 A1 * 7/2010 Ikushima .............. G02F 1/1303 137/15.01
2010/0177138 A1 * 7/2010 Ikushima .............. B05C 5/0225 347/19
2010/0181337 A1 * 7/2010 Ikushima .............. B05C 5/0225 222/1
2010/0224071 A1 * 9/2010 Ikushima ........... B01D 19/0036 96/194
2010/0229659 A1 * 9/2010 Ikushima ........... G01N 35/1011 73/864.11
2010/0294810 A1 * 11/2010 Ikushima .............. B05C 5/0237 222/309
2011/0042478 A1 * 2/2011 Ikushima .............. B05B 12/008 239/11
2011/0045167 A1 * 2/2011 Ikushima ............ B05C 11/1005 427/8
2011/0114673 A1 * 5/2011 Fiske ...................... B05C 5/001 62/3.64
2011/0184544 A1 * 7/2011 Ikushima ........... G05B 19/4093 700/97
2012/0097097 A1 * 4/2012 Ikushima ................ B05B 3/026 118/300
2012/0132671 A1 * 5/2012 Ikushima ............ B05C 11/1034 222/1
2012/0145743 A1 * 6/2012 Ikushima ................ F04B 23/02 222/1
2012/0156808 A1 * 6/2012 Ikushima .............. H01L 21/563 438/5
2012/0217262 A1 * 8/2012 Ikushima .............. B05C 5/0225 222/1
2012/0298038 A1 * 11/2012 Ikushima .............. B05B 12/122 118/712
2012/0313276 A1 * 12/2012 Ikushima .............. H01L 21/563 264/40.1
2013/0108521 A1 * 5/2013 Ikushima .............. B01L 3/0265 422/509
2013/0233891 A1 * 9/2013 Ikushima ............ B05C 11/1034 222/309
2013/0313745 A1 * 11/2013 Ikushima ................ B29C 70/68 264/40.1
2013/0345836 A1 * 12/2013 Ikushima ........... G05B 19/4093 700/86
2014/0217127 A1 * 8/2014 Ikushima ........... B65D 83/0022 222/420
2014/0252026 A1 * 9/2014 Ikushima .............. B05C 5/0229 222/71
2014/0252041 A1 * 9/2014 Ikushima ........... B65D 83/0005 222/309
2014/0346253 A1 * 11/2014 Ikushima .............. F04B 17/044 239/337
2014/0375051 A1 * 12/2014 Ikushima ............... F16J 15/106 285/363
2014/0376328 A1 * 12/2014 Ikushima ............ B01F 13/0863 366/191
2015/0014362 A1 * 1/2015 Ikushima ............ B05C 11/1034 222/504
2015/0048120 A1 * 2/2015 Ikushima ............ B05C 11/1002 222/318
2015/0182981 A1 * 7/2015 Ikushima .............. B05B 15/557 134/22.12
2015/0239641 A1 * 8/2015 Ikushima .......... B05C 17/00579 222/1
2015/0246368 A1 * 9/2015 Ikushima .............. B05B 9/0409 118/323
2015/0375507 A1 * 12/2015 Ikushima ................ B05B 12/06 347/44
2016/0023232 A1 * 1/2016 Ikushima ............ B05C 11/1047 427/421.1
2016/0107188 A1 * 4/2016 Ikushima ............ B05C 11/1034 222/1
2016/0165123 A1 * 6/2016 Ikushima ................ G06T 7/001 348/135
2016/0193624 A1 * 7/2016 Ikushima ............... H02N 2/043 239/102.2
2016/0199868 A1 * 7/2016 Ikushima ................ B05B 1/083 239/74
2016/0236228 A1 * 8/2016 Ikushima .............. B05C 5/0275
2016/0243839 A1 * 8/2016 Ikushima ................... B41J 2/19
2016/0279664 A1 * 9/2016 Ikushima ................ B05C 5/001
2016/0288552 A1 * 10/2016 Ikushima ................ B05B 12/06
2017/0066005 A1 * 3/2017 Ikushima ................ B05C 13/00
2017/0225188 A1 * 8/2017 Ikushima ................ B05C 11/00
2018/0009594 A1 * 1/2018 Ikushima ........... B65D 83/0005
2018/0071766 A1 * 3/2018 Ikushima ............ B05C 11/1034

(56) References Cited

U.S. PATENT DOCUMENTS

| | | | | |
|---|---|---|---|---|
| 2018/0208390 | A1* | 7/2018 | Ikushima | B05C 5/00 |
| 2018/0208450 | A1* | 7/2018 | Ikushima | B05C 5/0229 |
| 2018/0214903 | A1* | 8/2018 | Ikushima | B05C 5/0225 |
| 2018/0264506 | A1* | 9/2018 | Ikushima | B05C 11/10 |
| 2018/0272364 | A1* | 9/2018 | Ikushima | B05B 1/083 |
| 2019/0022692 | A1* | 1/2019 | Ikushima | F04B 17/003 |
| 2019/0054431 | A1* | 2/2019 | Ikushima | B01F 5/0068 |
| 2019/0358664 | A1* | 11/2019 | Ikushima | B41J 2/04588 |
| 2019/0376617 | A1* | 12/2019 | Ikushima | F16J 15/24 |

* cited by examiner

LIQUID MATERIAL-DISCHARGING DEVICE

TECHNICAL FIELD

The present invention relates to a liquid material discharge device in which good cleaning performance is obtained while the amount of a liquid material discarded during cleaning is reduced.

BACKGROUND ART

As discharge devices for applying a liquid material, such as an adhesive, in a desired pattern onto a substrate, there are known a discharge device that discharges a small amount of the liquid material through a discharge port by using a reciprocating rod-shaped member (plunger), and a discharge device that discharges a liquid material by rotating a screw including a spiral vane formed on the surface of a rod-shaped member to extend in an axial direction, thus causing the vane to carry the liquid material with rotation of the screw.

In Patent Document 1, for example, the applicant of this application proposes a discharge device comprising a liquid chamber from which a liquid material is discharged, a push member including a contact portion and a plunger with a narrower width than the liquid chamber, the plunger having a tip portion moved forward and backward in the liquid chamber, a collision member that is disposed adjacent to the push member on the opposite side to the plunger, and that includes a piston and a collision portion opposing to the contact portion, and drive means driving the push member and the collision member to move forward and backward, wherein the collision portion is collided against the contact portion to advance the push member at high speed and to discharge the liquid material.

In Patent Document 2, as another example, the applicant of this application proposes a liquid material discharge device of screw type comprising a screw including a spiral blade that is formed on a cylinder surface to extend from a tip in a lengthwise direction, a motor rotating the screw, a main body having a liquid material inlet through which a liquid material is supplied, a screw penetration hole through which the screw penetrates, and a housing covering a tip of the screw on the side closer to a discharge port, and a nozzle fitted to a tip of the housing and held in communication with the inside of the housing, the liquid material being discharged with rotation of the screw, wherein a gap is formed between the screw and an inner wall surface of the housing.

CITATION LIST

Patent Documents

Patent Document 1: International Publication Pamphlet No. 2008/126373

Patent Document 2: Japanese Patent Laid-Open Publication No. 2002-326715

SUMMARY OF INVENTION

Technical Problem

When the type of the liquid material used in the liquid material discharge device is changed, a flow path inside the device is cleaned. In the cleaning, the liquid material remaining in the flow path has to be discarded. From that point of view, there is a demand for minimizing the amount of the expensive liquid material discarded.

In a liquid material discharge device including a liquid feed path to supply a liquid material to a liquid chamber in which a discharge member is operated, it is tried to reduce the amount of the liquid material, which is discarded in the cleaning, by narrowing the liquid feed path (see, e.g., FIG. 1 of Patent Document 1).

However, narrowing the liquid feed path causes a problem of making it difficult to remove the liquid material remaining in the liquid feed path. Thus, even though an ultrasonic cleaner is used to clean the liquid feed path, there is a problem that a long time is taken to clean a member having an elongate liquid feed path.

In consideration of the above-described situations, an object of the present invention is to provide a liquid material discharge device in which good cleaning performance is obtained while the amount of the liquid material discarded in the cleaning is reduced.

Solution to Problem

In a liquid material discharge device including a storage container, such as a syringe, arranged laterally of a main body, a liquid feed path having a certain length needs to be provided. If the liquid feed path is formed to be relatively thick to increase the cleaning performance, etc., the problem of increasing the amount of the remaining liquid material arises.

As a result of intensive studies, the inventor has solved the above-mentioned problem and has accomplished the present invention on the basis of an idea of utilizing an elongate insert member that is removably inserted into the liquid feed path. More specifically, the present invention is constituted by the following technical means.

A liquid material discharge device according to the present invention comprises a discharge member made of a rod-shaped body, a liquid chamber which is wider than the discharge member and in which a tip portion of the discharge member is disposed, a discharge port in communication with the liquid chamber, a liquid feed path establishing communication between the liquid chamber and a liquid material storage container, and a drive device driving the discharge member, wherein the liquid material discharge device further comprises an elongate insert member that is removably inserted into the liquid feed path without cutting the communication between the liquid chamber and the liquid material storage container.

In the above liquid material discharge device, the liquid feed path may be constituted by a linear flow path having an opening at an end, and the insert member may include an insert portion inserted into the liquid feed path, and a plugging portion that plugs the opening at the end.

In the above liquid material discharge device, a length of the insert member may be ½ to 1 time a length L of the liquid feed path.

The above liquid material discharge device may further comprise a main body incorporating at least part of the drive device, and having a through-hole through which the discharge member is inserted, and a liquid feed member removably coupled to the main body and including an extension portion in which the liquid feed path is formed.

In the above liquid material discharge device including the liquid feed member, the liquid feed member may include a space constituting part of the liquid chamber, and a sealing member through which the discharge member penetrates.

In the above liquid material discharge device including the liquid feed member, the liquid feed member may have an upper opening in communication with the storage container.

In the above liquid material discharge device including the liquid feed member, the liquid feed member may include a container coupler for positioning and coupling of the storage container.

In the above liquid material discharge device including the liquid feed member, the extension portion of the liquid feed member may be separable.

In the above liquid material discharge device, the insert member may include projections and recesses formed on and in a surface thereof extending in a lengthwise direction.

In the above liquid material discharge device including the insert member provided with projections and recesses, the projections and the recesses may be formed by a plurality of projected portions in contact with an inner peripheral surface of the liquid feed path and grooves positioned between the projected portions. The grooves positioned between the projected portions may be formed by a spiral groove.

In the above liquid material discharge device, the insert member may include a plurality of stirring blades arranged side by side in a lengthwise direction.

In the above liquid material discharge device, at least a surface of the insert member may be made of a material softer than an inner peripheral surface of the liquid feed path. At least the surface of the insert member may be made of rubber or resin.

In the above liquid material discharge device, the insert member may be prepared as a plurality of insert members having different cross-sectional areas, and selected one of the insert members can be removably inserted into the liquid feed path.

In the above liquid material discharge device, the discharge member may be constituted by a plunger including a tip portion that is moved forward and backward in the liquid chamber, or by a screw including a tip portion that is rotated in the liquid chamber.

In the above liquid material discharge device, the discharge member may be a plunger extending vertically, the drive device may be a drive device moving the discharge member forward and backward, and the discharge device may be of jet type in which a liquid material is discharged in form of a flying droplet from the discharge port by colliding the forward-moving plunger against a valve seat that is formed in an inner bottom surface of the liquid chamber, or by stopping the forward-moving plunger just before the plunger is collided against the valve seat.

A liquid material discharge method according to the present invention is a method of discharging a liquid material by using the above-described liquid material discharge device.

A liquid material discharge method according to another aspect of the present invention is a method of discharging a liquid material containing filler by using the above-described liquid material discharge device provided with the plurality of stirring blades.

Advantageous Effects of Invention

According to the present invention, the liquid material discharge device can be provided in which good cleaning performance is obtained while the amount of the liquid material discarded in the cleaning is reduced.

BRIEF DESCRIPTION OF THE DRAWINGS

In FIG. 3. (a) represents a state that the insert member is inserted, (b) represents a state that the insert member is removed, (c) represents a state in preparation of a cotton-tipped stick, (d) represents a state that the cotton-tipped stick is inserted up to a middle of the liquid feed path, and (e) represents a state that the cotton-tipped stick is inserted up to near an end of the liquid feed path.

DESCRIPTION OF EMBODIMENTS

Related Art

Figure 11:
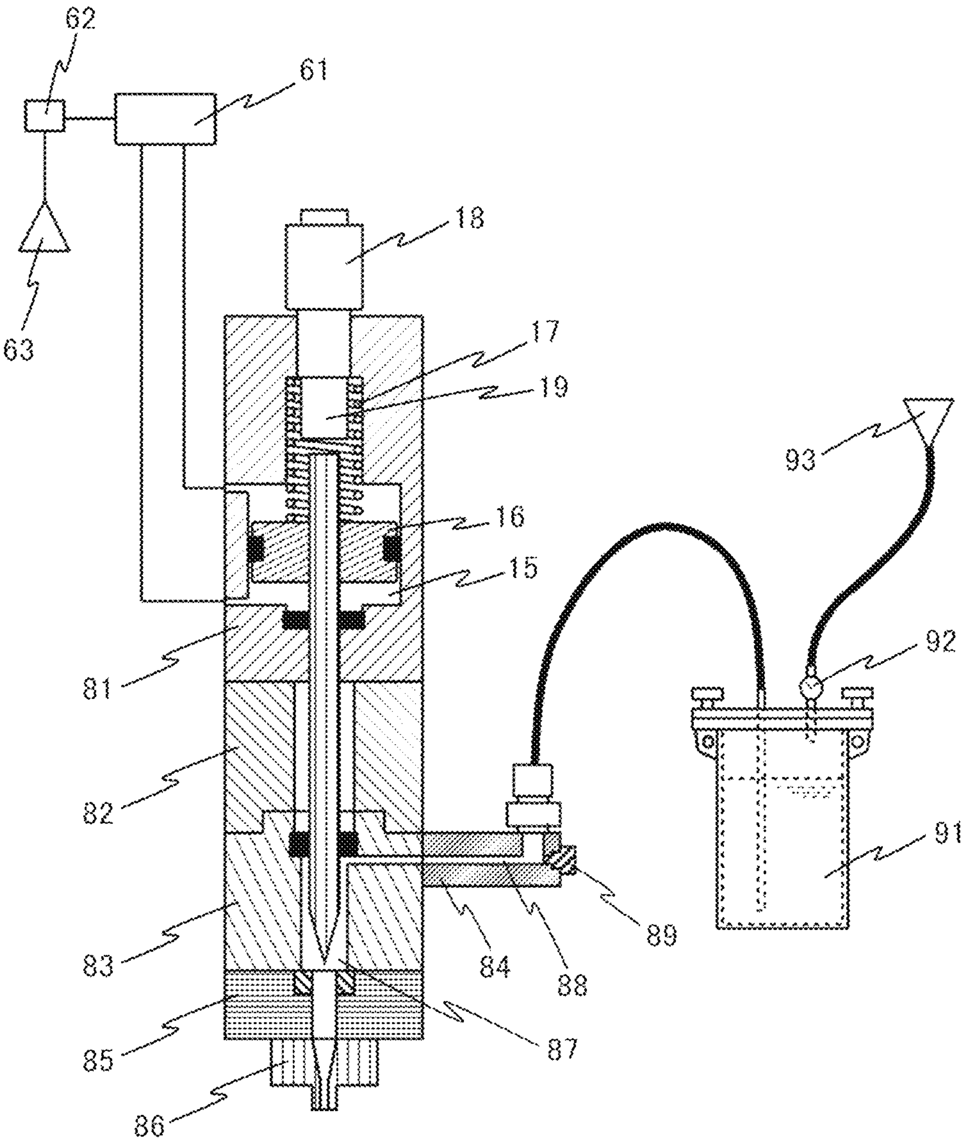
FIG. 11 is a front sectional view of a liquid material discharge device of related art.

A liquid material discharge device of related art, illustrated in FIG. 11, mainly includes a main-body upper portion 81, a main-body middle portion 82, a first liquid feed member 83, a second liquid feed member 84, a main-body lower portion 85, and a nozzle member 86.

A piston 16 coupled to a rear portion of a discharge member 11 is vertically slidably disposed in a piston chamber 15 that is formed in the main-body upper portion 2. Pressurized air is supplied to the piston chamber 15 from an air supply source 63 via a solenoid selector valve 61 and a pressure adjuster (regulator) 62.

The discharge member 11 is made of a rod-shaped body having a tapered shape toward a tip, and the tip portion of the discharge member 11 is positioned in a liquid chamber 87 that is formed in the first liquid feed member 83, the main-body lower portion 85, and the nozzle member 86. The discharge member 11 is reciprocally moved by the action of the pressurized air supplied from the air supply source 63 and of a spring 17, whereby a liquid material is discharged from a discharge port formed at a lower end of the nozzle member 86.

The liquid chamber 87 is in communication with a liquid feed path 88 through an opening that is formed in an upper lateral surface of the liquid chamber 87.

A plug 89 is screwed into a side opening that is formed at an end of the liquid feed path 88 on the opposite side to the liquid chamber 87. When the liquid material is filled into the liquid feed path 88, the plug 89 is initially detached to remove bubbles.

The liquid feed path 88 is in communication with a storage tank 91 through a tube. Pressurized air supplied from the air supply source 93 under pressure regulated by a pressure reducing valve 92 is supplied to an upper space in the storage tank 91.

The liquid material discharge device of related art has a problem that, because the liquid feed path 88 is so thin and a general cotton-tipped stick for industrial use cannot be inserted into the liquid feed path 88, it is difficult to remove the liquid material remaining in the liquid feed path.

First Embodiment

Figure 1:
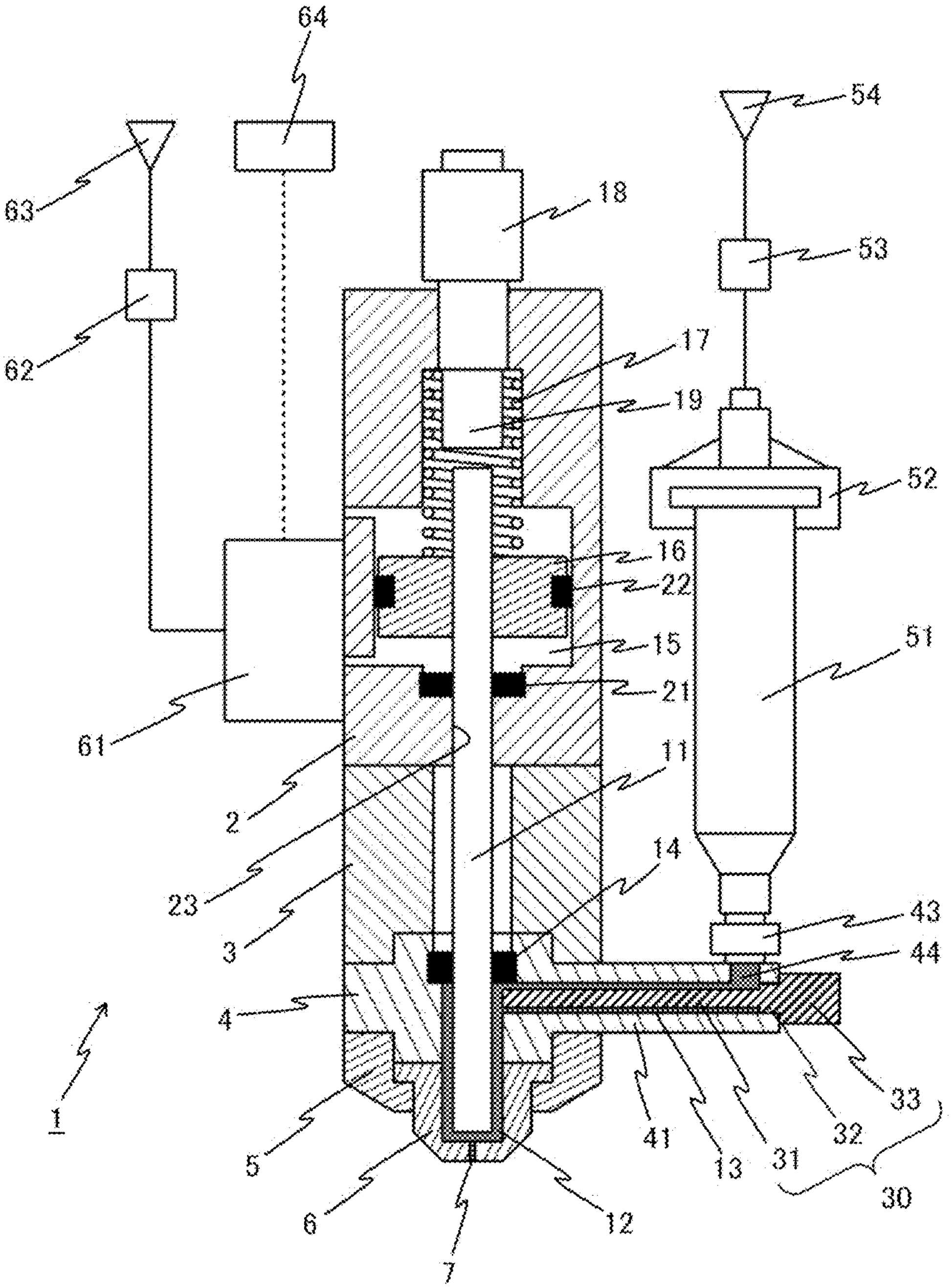
FIG. 1 is a front sectional view of a liquid material discharge device according to a first embodiment (when an insert member is inserted).

A liquid material discharge device 1 according to a first embodiment of the present invention, illustrated in FIG. 1, mainly includes a main-body upper portion 2, a main-body lower portion 3, a liquid feed member 4, a nozzle fixture 5, a nozzle member 6, and a control unit 64.

The main-body upper portion 2 is made of a block-like member having a rectangular parallelepiped shape, and a piston chamber 15 is formed inside the main-body upper portion 2. A piston 16 coupled to a rear portion of a discharge member 11 is vertically slidably disposed in the piston chamber 15. A sealing member 22 is annularly disposed around a lateral surface of the piston 16 to hold each of an upper space and a lower space of the piston chamber 15 in an airtight state. An annular sealing member 21 is fitted to a recess formed in a bottom surface of the piston chamber 15. A through-hole 23 extending vertically is formed at a center of the recess in the bottom surface of the piston chamber 15. The discharge member 11 is inserted through the sealing member 21 and the through-hole 23.

Pressurized air is supplied to the lower space of the piston chamber 15 through a solenoid selector valve 61. The solenoid selector valve 61 is in communication, via a pressure adjuster (regulator) 62, with an air supply source 63 that supplies the pressurized air. The pressure adjuster 62 is constituted by, for example, a pressure reducing valve or a combination of a pressure reducing valve and a buffer tank. In accordance with an instruction from the control unit 64, the solenoid selector valve 61 is operated to be switched over between a first position at which the pressure adjuster 62 and the lower space of the piston chamber 15 are in communication with each other and a second position at which the lower space of the piston chamber 15 and the outside (atmosphere) are in communication with each other. When the solenoid selector valve 61 takes the first position, the discharge member 11 is moved backward by the action of the pressurized air, and when it takes the second position, the discharge member 11 is moved forward by the action of biasing force of a spring 17. Thus, the solenoid selector valve 61 and the spring 17 constitute a drive device for driving the discharge member 11.

The control unit 64 is a computer for controlling the operation of the solenoid selector valve 61.

Although, in the illustrated embodiment, the solenoid selector valve 61 is directly fixed to the main-body upper portion 2, it may be arranged at a position away from the main-body upper portion 2 with, for example, a tube (pressure feed tube) interposed between them.

The discharge member 11 is a valve member having a circular columnar shape, and it extends to vertically penetrate through the main-body upper portion 2, the main-body lower portion 3, and the liquid feed member 4. A lower end portion of the discharge member 11 is positioned in a liquid chamber 12. When the discharge member 11 is moved away from a valve seat constituted in an inner bottom surface of the liquid chamber 12, a discharge port 7 and the liquid chamber 12 are communicated with each other, whereupon the liquid material is discharged. When the discharge member 11 is seated against the valve seat, the communication between the discharge port 7 and the liquid chamber 12 is cut, whereupon the discharge of the liquid material is stopped. Because the discharge member 11 has a smaller diameter than the liquid chamber 12, a lateral peripheral surface of the discharge member 11 is avoided from contacting with an inner peripheral surface of the liquid chamber 12. Thus, friction generated at the lateral peripheral surface of the discharge member 11 is minimized, and hence the discharge member 11 can be moved at high speed.

The technical concept of the present invention can be of course further applied to discharge devices of different types from the discharge device 1 according to this embodiment, namely (a) a seating jet type in which a valve member (discharge member) is collided against the valve seat, thus causing the liquid material to be discharged in the form of a flying droplet from the discharge port, and (b) a non-seating jet type in which a valve member (discharge member) is moved and then abruptly stopped, thus causing the liquid material to be discharged in the form of a flying droplet from the discharge port without colliding the valve member (discharge member) against the valve seat. Also in the jet discharge devices, the discharge member of which tip portion has a narrower width than the liquid chamber 12 is used to move the discharge member forward and backward at high speed.

Although the tip of the discharge member 11 has a flat shape in FIG. 1, the tip is not limited to the flat shape, and it may have, for example, a spherical shape, a concave shape, a tapered shape, or a shape including a projection at a position facing the discharge port 7. The discharge member 11 is not limited to the valve member having the circular columnar shape, and it may be constituted by, for example, a rotating screw in some cases. The discharge member to which the present invention is applied includes a rod-shaped member that extends in a vertical direction, and that discharges the liquid material in the liquid chamber from the discharge port with reciprocating forward and backward movement or rotation. The drive device for driving the discharge member is constituted by, for example, a motor, a piezoelectric element, or a resilient member such as a spring, and a pressurized-air switching valve, or a pneumatic actuator.

The rear portion of the discharge member 11 is coupled to the piston 16, and the piston 16 is biased downward by the spring 17. The spring 17 is a coil spring. A rear end of the discharge member 11 and a stroke adjustment screw 19 are arranged opposite to each other in an inner space of the spring 17. The stroke adjustment screw 19 is coupled to a knob 18 that is inserted into the main-body upper portion 2 from its upper surface. A backward movement limit position of the discharge member 11 can be adjusted by turning the knob 18.

The main-body lower portion 3 made of a block-like member having a rectangular parallelepiped shape is disposed under the main-body upper portion 2. A through-hole penetrating vertically through the main-body lower portion 3 has a larger diameter than the discharge member 11, and the discharge member 11 is inserted through the through-hole. The liquid feed member 4 having a greater width than the main-body lower portion 3 in a horizontal direction is disposed under the main-body lower portion 3. The nozzle fixture 5 is disposed under the liquid feed member 4. The nozzle fixture 5 has a cup-like shape provided with an opening formed in its bottom surface, and it retains a flange portion of the nozzle member 6 inserted into the opening, thus coupling the liquid feed member 4 and the nozzle member 6. The liquid feed member 4 and the nozzle member 6 can be easily removed from the main-body lower portion 3 and the nozzle fixture 5.

The liquid feed member 4 has a stepped through-hole extending vertically. An annular sealing member 14 is disposed at a step of the stepped through-hole, and a space in the stepped through-hole under the sealing member 14 constitutes part of the liquid chamber 12. Because a width (diameter) of the liquid chamber 12 is greater than that of the discharge member 11, the lateral peripheral surface of the discharge member 11 is avoided from contacting with the inner peripheral surface of the liquid chamber 12. The discharge member 11 is inserted through a hole formed in the sealing member 14 and having substantially the same diameter as that of the discharge member 11.

The liquid feed member 4 includes an extension portion 41 straightly extending in the horizontal direction from an extension line of the lateral surfaces of the main body (2, 3). The liquid feed path 13 straightly extending in the horizontal direction is formed inside the extension portion 41. The liquid feed path 13 has a constant diameter over an entire length. The extension portion 41 is constituted in such a length as making a storage container 51 easily replaceable. Like the related art illustrated in FIG. 11, the extension portion 41 may be constituted to be detachable along the extension line of the lateral surfaces of the main body (2, 3) (namely, the extension portion 41 may be constituted by the second liquid feed member 84 in FIG. 11).

A height (width in the vertical direction) of the liquid feed member 4 is smaller than that of each of the main-body upper portion 2 and the main-body lower portion 3. Since the liquid feed member 4 in this embodiment is constituted to be compact (thin) in the vertical direction, it is suitable for cleaning with use of an ultrasonic cleaner.

Unlike this embodiment, it is also possible to use a liquid feed member in which a liquid feed path straightly extending in an oblique direction is formed (in such a case, however, the width of the liquid feed member in the vertical direction is increased).

The liquid chamber 12 is in communication with the liquid feed path 13 through an opening formed in an upper lateral surface of the liquid chamber 12. The diameter of the liquid feed path 13 is preferably set to a such a value as allowing a cotton-tipped stick for industrial use to be inserted into the liquid feed path 13, and it is, for example, 2.5 mm to 10 mm (preferably not less than 3 mm and more preferably not less than 4 mm). In general, heads of many cotton-tipped sticks for industrial use have diameters of about 5 mm.

An upper opening 44 formed in an upper surface of the liquid feed path 13 near its end on the opposite side to the liquid chamber 12 is in communication with the storage container 51, and the liquid material in the storage container 51 is supplied to the liquid feed path 13 through the upper opening 44.

The storage container 51 is a commercially available syringe made of resin or metal, and is detachably attached to the liquid feed member 4 using a container coupler 43. The container coupler 43 couples a lower end portion of the storage container 51 to the extension portion 41 of the liquid feed member 4, and further positions the storage container 51 to be located laterally of the main body (2, 3). An adapter 52 in communication with a pressure reducing valve 53 via a tube is fitted to an upper opening of the storage container 51. Pressurized air supplied from an air supply source 54 under pressure regulated by the pressure reducing valve 53 is supplied to an upper space in the storage container 51.

An insert member 30 is inserted through a lateral opening 45 formed at an end of the liquid feed path 13 on the opposite side to the liquid chamber 12. A thread groove 42 is formed in an inner peripheral surface of the liquid feed path 13 near the lateral opening 45.

The insert member 30 includes an insert portion 31 having a stick-like shape, a plugging portion 32 provided at an end of the insert portion 31, and a knob portion 33 coupled to both the insert portion 31 and the plugging portion 32.

The insert portion 31 is a circular columnar portion having a smaller diameter than the liquid feed path 13, and its length is ½ to 1 time (preferably ⅔ to 1 time) a length L of the liquid feed path 13. For the purpose of not damaging the inner peripheral surface of the liquid feed path 13 when the insert portion 31 is inserted and withdrawn, at least a surface of the insert portion 31 is preferably made of a material softer than the inner peripheral surface of the liquid feed path 13. It is disclosed here that, for example, when the inner peripheral surface of the liquid feed path 13 is made of metal, the surface (or the entirety) of the insert portion 31 is made of rubber or resin.

In the first embodiment, the diameter of the liquid feed path 13 is set to 3 mm, and the diameter of the insert portion 31 is set to 2 mm. Furthermore, in the first embodiment, the insert portion 31 has a similar cross-sectional shape to that of the liquid feed path 13. By inserting the insert portion 31 into the liquid feed path 13 and turning the knob portion 33 to make tight screwing, the insert portion 31 is fixed in a state positioned on a center axis of the liquid feed path 13.

By inserting the stick-shaped insert portion 31 into the liquid feed path 13 and reducing the volume of the liquid feed path 13, it is possible to reduce the amount of the liquid material remaining in the liquid feed path 13, and hence to reduce wasteful discarding of the liquid material in cleaning of the liquid feed member 4. By preparing a plurality of insert members 30 of which insert portions 31 have different cross-sectional areas, the amount of the liquid material supplied from the liquid feed path 13 to the liquid chamber 12 can also be adjusted depending on usages. It is disclosed here that, for example, when a liquid material having high viscosity is used, the insert member 30 having a cross-sectional area of the insert portion 31 smaller than that in the insert member 30 used for the liquid material having low viscosity is to be used. When discharge work includes a mode in which the cross-sectional area of the insert portion 31 is preferably set to zero, the plug 89 in the related art can also be used as one of the insert members 30.

The plugging portion 32 is a circular columnar portion having a larger diameter than the insert portion 31, and has a thread groove formed in its surface. The plugging portion 32 is formed in a length just enough to close a flow path in communication with the lateral opening 45, and it serves to prevent bubbles from remaining in the flow path in communication with the lateral opening 45. The insert member 30 may be fixed to the liquid feed member 4 by using a fixture instead of forming the thread groove in the plugging portion 32.

The knob portion 33 is a circular columnar portion having a larger diameter than the plugging portion 32, and its surface is subjected to antiskid treatment. When the insert member 30 is inserted into the lateral opening 45 formed in the lateral surface of the liquid feed member 4 and the knob portion 33 is manually turned in a first direction, the thread groove in the surface of the plugging portion 32 and the thread groove 42 are screwed with each other. When the knob portion 33 is turned in a second direction, the screwed state is released to allow removal of the insert member 30. The lateral opening 45 formed in the lateral surface of the liquid feed member 4 can be further utilized as a bubble purge opening when the liquid material is filled into the liquid feed path 13 prior to start of the discharge work. The insert member 30 is removed from the liquid feed member 4 at the time of filling the liquid material into the liquid feed path 13, and the insert member 30 is fitted after confirming outflow of the liquid material from the discharge port.

Figure 2:
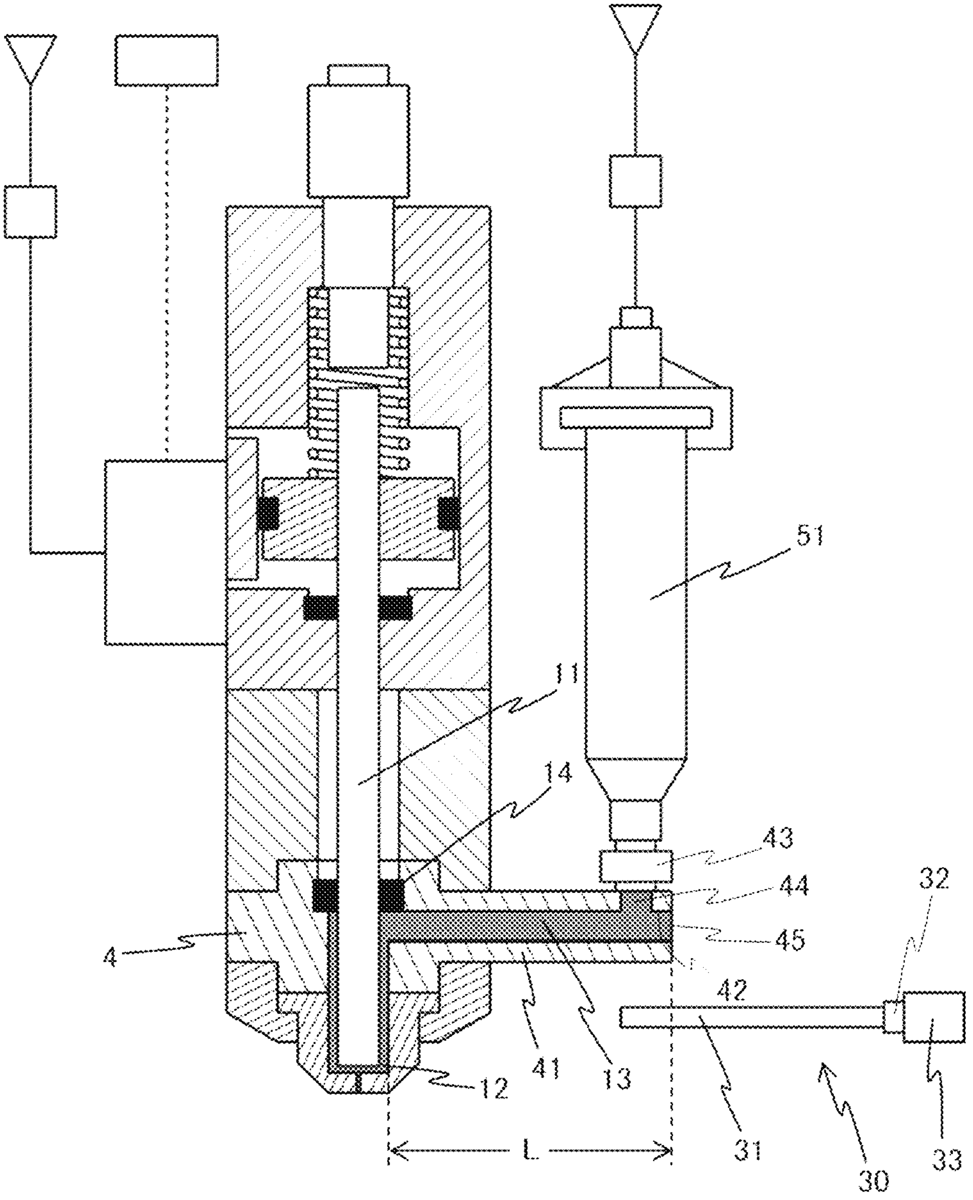
FIG. 2 is a front sectional view of the liquid material discharge device according to the first embodiment (when the insert member is removed).

FIG. 2 is a front sectional view of the liquid material discharge device 1 when the insert member 30 is removed. The liquid material (not illustrated) adheres to the (peripheral) surface of the insert portion 31 having been withdrawn out. In order to reduce the amount of the liquid material remaining in the liquid feed path 13 when the insert member 30 is removed, projections and recesses or annular ridges for scraping out the liquid material may be formed on the surface of the insert portion 31 (see a later-described third embodiment).

Figure 3:
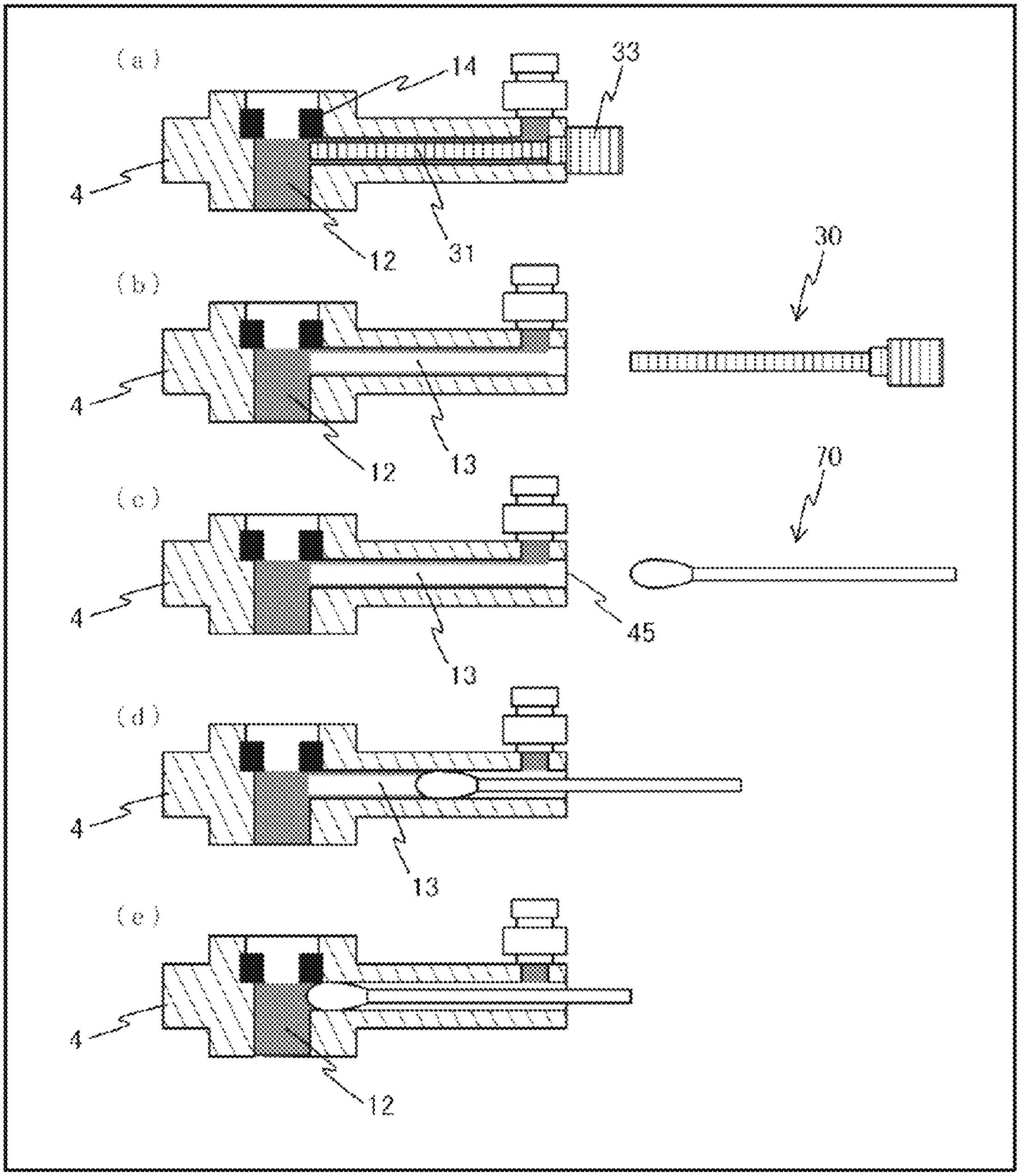
FIG. 3 is a front sectional view referenced to explain a method for cleaning a liquid feed path.

FIG. 3 is a front sectional view referenced to explain a method for cleaning the liquid feed path 13. In FIG. 3, (a) represents a state that the insert member 30 is inserted into the liquid feed path 13, (b) represents a state that the insert member 30 has been removed from the liquid feed path 13, (c) represents a state before a cotton-tipped stick 70 is inserted into the liquid feed path 13, (d) represents a state that the cotton-tipped stick 70 is inserted up to a middle of the liquid feed path 13, and (e) represents a state that the cotton-tipped stick 70 is inserted up to near an end of the liquid feed path 13.

In FIG. 3, the remaining liquid material is denoted in gray. As seen from FIG. 3(*b*), the amount of the liquid material remaining in the liquid feed path 13 is small in the state that the insert member 30 has been removed from the liquid feed path 13.

As illustrated in FIGS. 3(*d*) and 3(*e*), the liquid feed path 13 can be easily cleaned by inserting the cotton-tipped stick 70 into the liquid feed path 13 and by moving the cotton-tipped stick 70 forward and backward.

When the liquid feed member 4 is cleaned by an ultrasonic cleaner after the cleaning with the cotton-tipped stick 70, a cleaning time can be shortened. The insert member 30 having been removed can also be cleaned by the ultrasonic cleaner.

With the above-described liquid material discharge device 1 according to the first embodiment, wasteful discarding of the liquid material in the cleaning of the liquid feed member 4 can be reduced while the amount of the liquid material supplied to the liquid chamber 12 is adjusted with the insert member 30. Furthermore, since the cross-sectional area of the liquid feed path 13 can be increased in comparison with the case of not using the insert member 30, the cleaning time for the liquid feed path 13 can be shortened. In addition, since the liquid feed path 13 can be formed in a larger diameter than in the related art, visual check after the cleaning can be made more easily.

Second Embodiment

Figure 4:
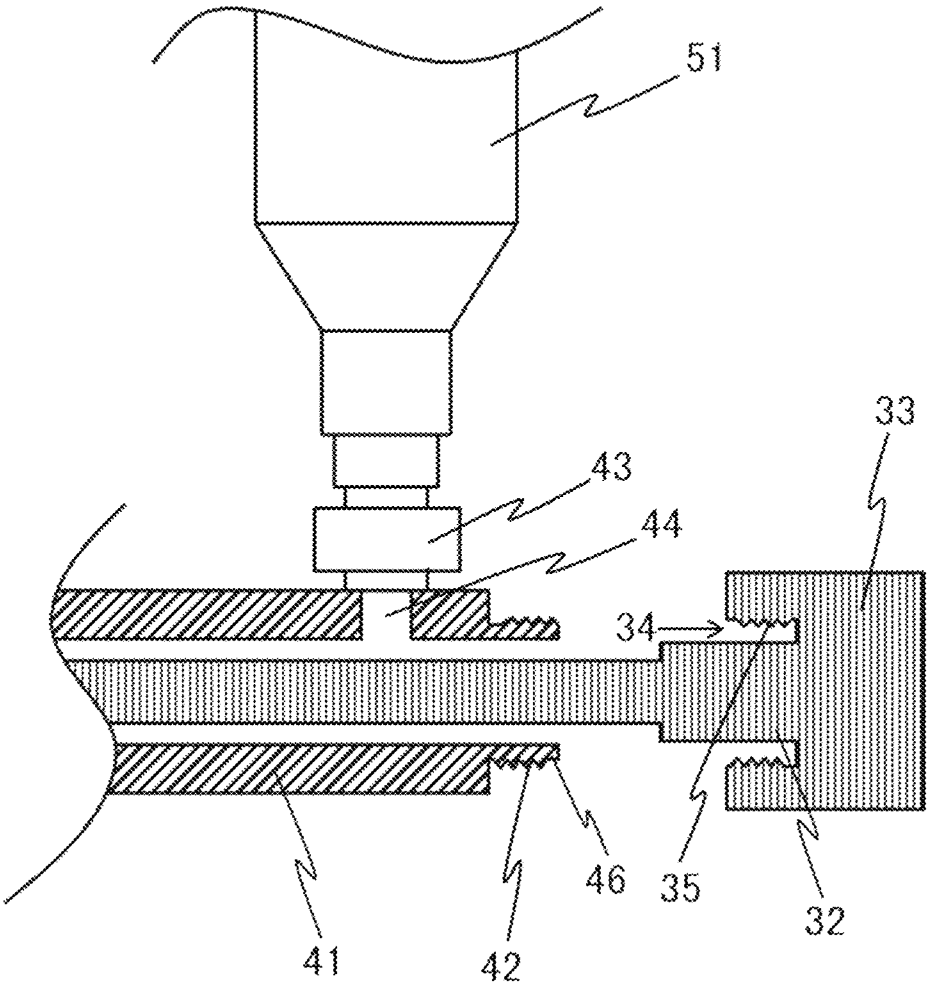
FIG. 4 is a front sectional view of principal part of a liquid material discharge device according to a second embodiment.

A liquid material discharge device 1 according to a second embodiment, illustrated in FIG. 4, is mainly different from the discharge device according to the first embodiment in that the extension portion 41 includes the thread groove 42 formed in an outer periphery at its end, and that the insert member 30 includes a thread groove 35 formed in a slot 34. The following description is made mainly about the different points from the first embodiment, and description of the common components is omitted.

The extension portion 41 in the second embodiment includes a small-diameter tubular portion 46 at its end, and the thread groove 42 is formed in an outer periphery of the tubular portion 46. The insert member 30 includes the slot 34 having an annular shape and formed in the knob portion 33. The thread groove 35 is formed in an outer-side periphery defining the slot 34 such that the insert member 30 can be fixed by screwing the thread groove 35 with the thread groove 42 of the extension portion 41.

The other structure is similar to that in the first embodiment, and hence description of the other structure is omitted.

The above-described liquid material discharge device 1 according to the second embodiment can also provide similar operation effects to those in the first embodiment. In addition, since the liquid material does not contact with the thread grooves (35, 42), a problem of the dried liquid material sticking to the thread grooves does not occur.

Third Embodiment

Figure 5:
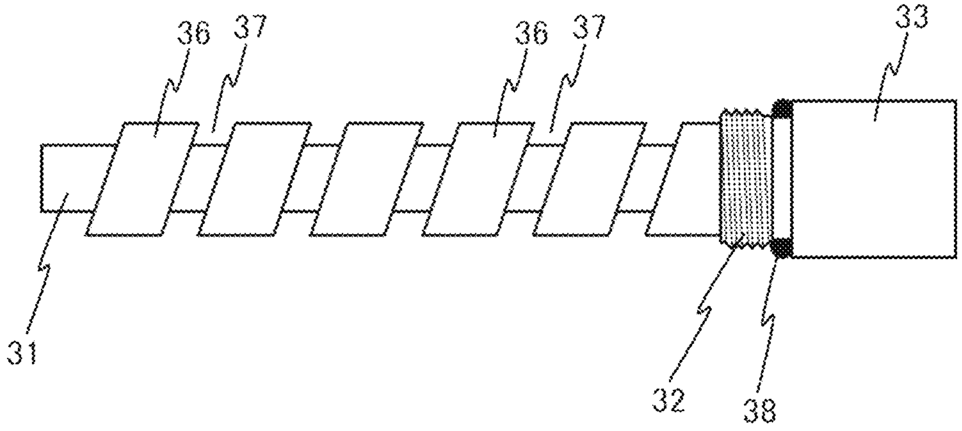
FIG. 5 is a front view of an insert member according to a third embodiment.

An insert member 30 according to a third embodiment, illustrated in FIG. 5, is mainly different from the insert member according to the first embodiment in that projected portions 36 and a spiral groove 37 are formed on and in an outer periphery of the insert portion 31. The following description is made mainly about the different points from the first embodiment, and description of the common components is omitted.

Figure 6:
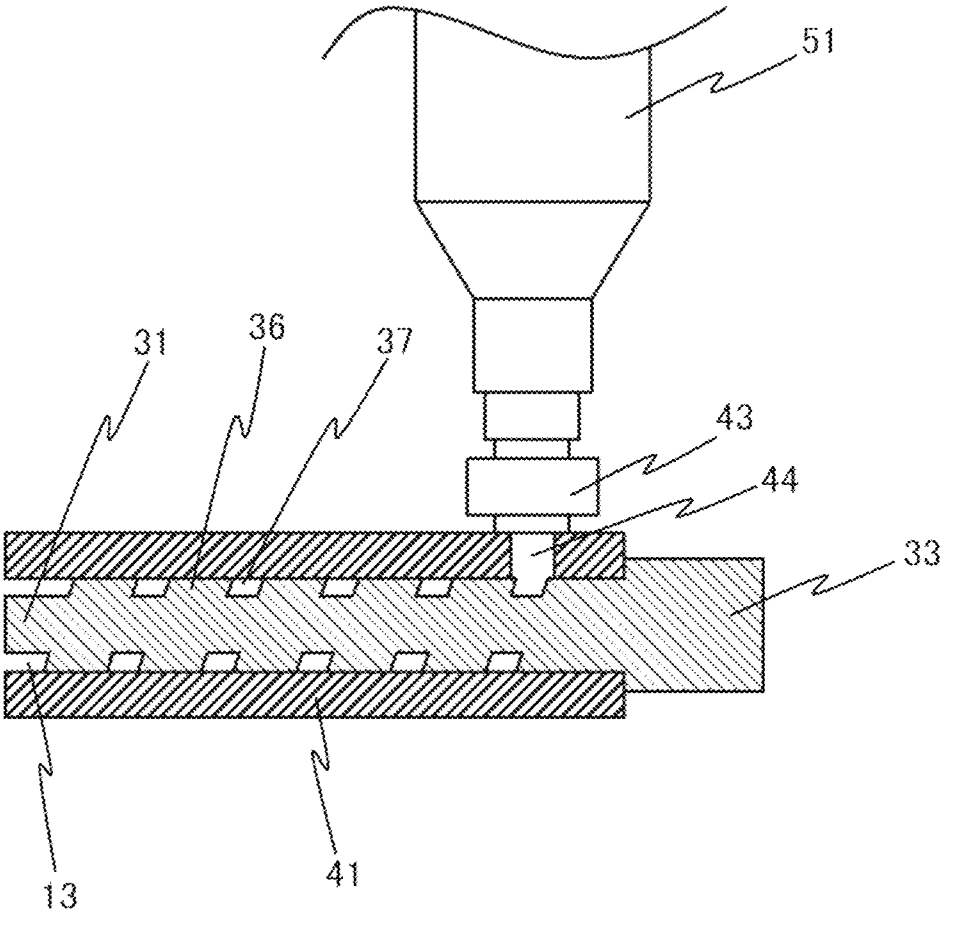
FIG. 6 is a front sectional view of principal part of a liquid material discharge device according to the third embodiment.

The insert portion 31 in the third embodiment includes a plurality of projected portions 36 and the spiral groove 37 formed on and in its outer periphery. The projected portions 36 have the same width, and the spiral groove 37 also has a constant width from a start point to an end point. When the insert portion 31 is inserted into the liquid feed path 13, the projected portions 36 come into contact with the inner peripheral surface of the liquid feed path 13, and the spiral groove 37 serves as a flow path through which the liquid material is supplied to the liquid chamber 12. FIG. 6 is a front sectional view illustrating a state that the insert member 30 is fitted into the liquid feed path 13 (with omission of an O-ring 38).

In the third embodiment, because the projected portions 36 are held in contact with the inner peripheral surface of the liquid feed path 13, at least the projected portions 36 are preferably made of a material having low hardness, such as rubber or resin, from the viewpoint of not damaging the inner peripheral surface of the liquid feed path 13. The O-ring 38 is arranged in a stepped portion between the plugging portion 32 and the knob portion 33.

The other structure is similar to that in the first embodiment, and hence description of the other structure is omitted.

The above-described insert member 30 according to the third embodiment can also provide similar operation effects to those in the first embodiment. In addition, according to the third embodiment, since a scraping action is obtained with the projected portions 36, the amount of the liquid material remaining in the liquid feed path 13 can be reduced in comparison with that in the first embodiment.

Fourth Embodiment

Figure 7:
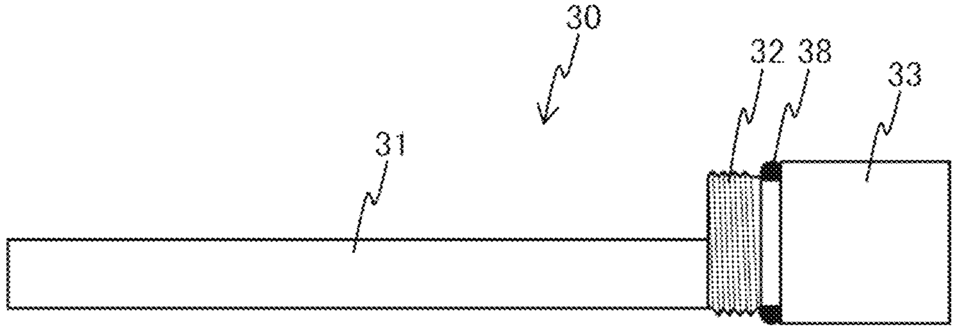
FIG. 7 is a front view of an insert member according to a fourth embodiment.

An insert member 30 according to a fourth embodiment, illustrated in FIG. 7, is mainly different from the insert member according to the first embodiment in that the insert portion 31 is constituted to be held in contact with a lower surface of the liquid feed path 13. The following description is made mainly about the different points from the first embodiment, and description of the common components is omitted.

The insert portion 31 in the fourth embodiment is arranged under a center axis of the insert member 30. More specifically, the insert portion 31 is arranged such that a lower end of the insert portion 31 and a lower end of the plugging portion 32 are aligned with each other.

Figure 8:
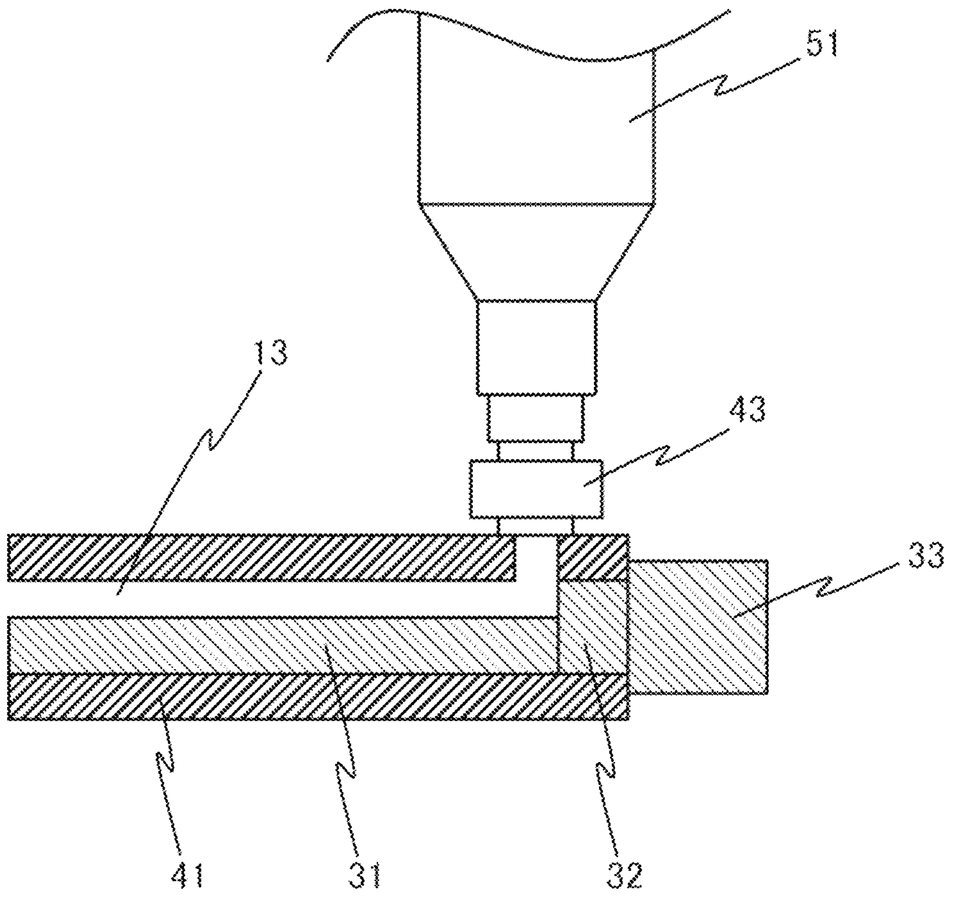
FIG. 8 is a front sectional view of principal part of a liquid material discharge device according to the fourth embodiment.

FIG. 8 is a front sectional view illustrating a state that the insert member 30 is fitted into the liquid feed path 13 (with omission of the O-ring 38). According to the fourth embodiment as well, since the volume of the liquid feed path 13 is reduced with the insertion of the insert portion 31, the amount of the liquid material supplied to the liquid chamber 12 can be reduced.

In the fourth embodiment, because the insert portion 31 is held in contact with the inner peripheral surface of the liquid feed path 13, the insert portion 31 is preferably made of a material having low hardness, such as rubber or resin, from the viewpoint of not damaging the inner peripheral surface of the liquid feed path 13. The O-ring 38 is arranged in the stepped portion between the plugging portion 32 and the knob portion 33.

The other structure is similar to that in the first embodiment, and hence description of the other structure is omitted.

The above-described insert member 30 according to the fourth embodiment can also provide similar operation effects to those in the first embodiment.

Fifth Embodiment

Figure 9:
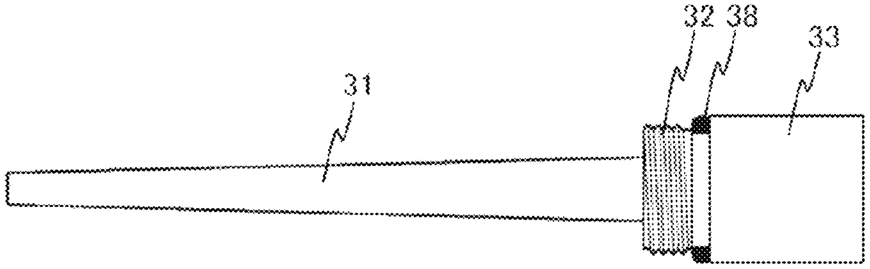
FIG. 9(*a*) is a front view of an insert member according to a fifth embodiment, and 9(*b*) is a front view of an insert member according to a sixth embodiment.
Figure 9:
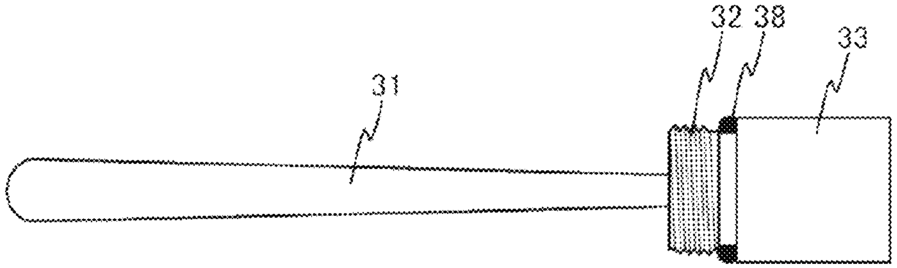

An insert member 30 according to a fifth embodiment, illustrated in FIG. 9(*a*), is different from the insert member according to the first embodiment in that the insert portion 31 is formed in a tapered shape toward a tip.

The other structure is similar to that in the first embodiment, and hence description of the other structure is omitted.

The above-described insert member 30 according to the fifth embodiment can also provide similar operation effects to those in the first embodiment.

Sixth Embodiment

An insert member 30 according to a sixth embodiment, illustrated in FIG. 9(*b*), is different from the insert member according to the first embodiment in that the insert portion 31 is formed in a reversely-tapered shape that gradually becomes thicker toward a tip portion. The insert member 30 according to the sixth embodiment is further different from the insert member according to the first embodiment in that the tip of the insert portion 31 has a spherical shape.

The other structure is similar to that in the first embodiment, and hence description of the other structure is omitted.

The above-described insert member 30 according to the sixth embodiment can also provide similar operation effects to those in the first embodiment.

Seventh Embodiment

Figure 10:
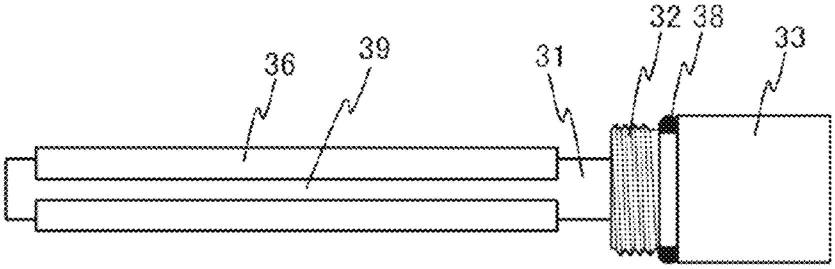
FIG. 10(*a*) is a front view of an insert member according to a seventh embodiment, and FIG. 10(*b*) is a front view of an insert member according to an eighth embodiment.
Figure 10:
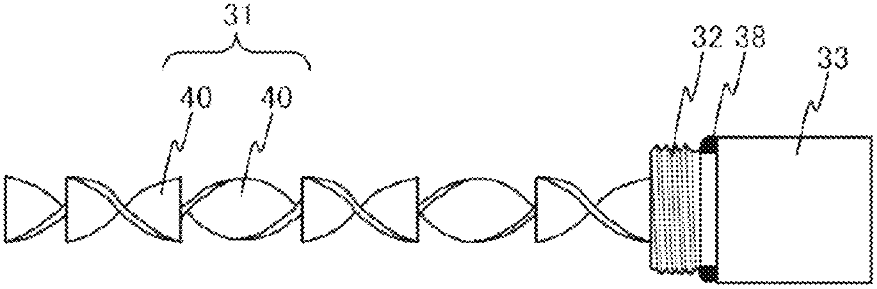

An insert member 30 according to a seventh embodiment, illustrated in FIG. 10(*a*), is mainly different from the insert member according to the first embodiment in that a projected portion 36 having a C-shaped cross-section and a communication groove 39 are formed on and in the outer periphery of the insert portion 31. The following description is made mainly about the different points from the first embodiment, and description of the common components is omitted.

The projected portion 36 in the seventh embodiment has a C-shaped cross-section and a height (vertical width) set such that the projected portion 36 contacts with the inner peripheral surface of the liquid feed path 13. An opening of the C-shaped projected portion 36 constitutes the communication groove 39 having an elongate shape. The communication groove 39 serves as a flow path through which the liquid material supplied from the storage container is fed to the liquid chamber 12.

In the seventh embodiment, because the projected portion 36 is held in contact with the inner peripheral surface of the liquid feed path 13, at least the projected portion 36 is preferably made of a material having low hardness, such as rubber or resin, from the viewpoint of not damaging the inner peripheral surface of the liquid feed path 13. The O-ring 38 is arranged in the stepped portion between the plugging portion 32 and the knob portion 33.

The other structure is similar to that in the first embodiment, and hence description of the other structure is omitted.

The above-described insert member 30 according to the seventh embodiment can also provide similar operation effects to those in the first embodiment. In addition, according to the seventh embodiment, a scraping action is obtained with the projected portion 36 and the communication groove 39 when the insert member 30 is removed while rotating the same.

Eighth Embodiment

An insert member 30 according to an eighth embodiment, illustrated in FIG. 10(*b*), is mainly different from the insert member according to the first embodiment in including a plurality of stirring blades 40 that are arranged side by side in a lengthwise direction. The following description is made mainly about the different points from the first embodiment, and description of the common components is omitted.

The insert portion 31 in the eighth embodiment is constituted by coupling the stirring blades 40 in the lengthwise direction. The number of stirring blades 40 to be coupled is not limited to a value illustrated in the drawing. Any desired number (preferably three or more) of stirring blades having any desired shape can be arranged such that the insert portion 31 has an elongate shape (substantially a stick-like shape or a linear shape). Although surfaces of the stirring blades 40 are formed smooth in this embodiment, projections and recesses may be formed on and in the surfaces of the stirring blades unlike this embodiment.

When the insert member 30 according to the eighth embodiment is fitted into the liquid feed path 13, the liquid material that is fed to pass through the liquid feed path 13 reaches the liquid chamber 12 while being stirred by the stirring blades 40.

The O-ring 38 is arranged in the stepped portion between the plugging portion 32 and the knob portion 33.

The other structure is similar to that in the first embodiment, and hence description of the other structure is omitted.

The above-described insert member 30 according to the eighth embodiment can also provide similar operation effects to those in the first embodiment. In addition, since the liquid material is stirred in the liquid feed path 13, the eighth embodiment is suitable for discharging a liquid material containing filler (such as a solder paste).

It is to be noted that, although the preferred embodiments of the present invention have been described above, the technical scope of the present invention is not limited by the above embodiments. The above embodiments can be variously modified and improved, and those modified and improved embodiments also fall within the technical scope of the present invention.

LIST OF REFERENCE SIGNS

1: discharge device, 2: main-body upper portion, 3: main-body lower portion, 4: liquid feed member, 5: nozzle fixture, 6: nozzle member, 7: discharge port, 11: discharge member, 12: liquid chamber, 13: liquid feed path, 14: sealing member, 15: piston chamber, 16: piston, 17: spring, 18: knob, 19: stroke adjustment screw, 21: sealing member, 22: sealing member, 30: insert member, 31: insert portion, 32: plugging portion, 33: knob portion, 34: slot, 35: thread groove, 36: projected portion, 37: spiral groove, 38: O-ring, 39: communication groove, 40: stirring blade, 41: extension portion, 42: thread groove, 43: container coupler, 44: upper opening, 45: lateral opening, 46: tubular portion, 51: storage container, 52: adapter, 53: pressure reducing valve, 54: air supply source, 61: solenoid selector valve, 62: pressure adjuster, 63: air supply source, 64: control unit, 70: cotton-tipped stick, 81: main-body upper portion, 82: main-body middle portion, 83: first liquid feed member, 84: second liquid feed member, 85: main-body lower portion, 86: nozzle member, 87: liquid chamber, 88: liquid feed path, 89: plug, 91: storage tank, 92: pressure reducing valve, 93: air supply source

The invention claimed is:

1. A liquid material discharge device comprising:

a discharge member made of a rod-shaped body;

a liquid chamber which is wider than the discharge member and in which a tip portion of the discharge member is disposed;

a discharge port in communication with the liquid chamber;

a liquid feed path establishing communication between the liquid chamber and a liquid material storage container; and a drive device driving the discharge member, wherein the liquid material discharge device further comprises an elongate insert member that is removably inserted into the liquid feed path without cutting the communication between the liquid chamber and the liquid material storage container, and wherein the insert member is fixed and does not rotate in the liquid feed path during discharging of liquid material.

2. The liquid material discharge device according to claim 1, wherein the liquid feed path is constituted by a linear flow path having an opening at an end, and the insert member includes an insert portion inserted into the liquid feed path, and a plugging portion that plugs the opening at the end.

3. The liquid material discharge device according to claim 1, wherein a length of the insert member is ½ to 1 time a length L of the liquid feed path.

4. The liquid material discharge device according to claim 1, further comprising a main body incorporating at least part of the drive device, and having a through-hole through which the discharge member is inserted, and a liquid feed member removably coupled to the main body and including an extension portion which the liquid feed path is formed.

5. The liquid material discharge device according to claim 4, wherein the liquid feed member includes a space constituting part of the liquid chamber, and a sealing member through which the discharge member penetrates.

6. The liquid material, discharge device according to claim 4, wherein the liquid feed member has an upper opening in communication with the storage container.

7. The liquid material discharge device according to claim 4, wherein the liquid feed member includes a container coupler for positioning and coupling of the storage container.

8. The liquid material discharge device according to claim 4, wherein the extension portion of the liquid feed member is separable.

9. The liquid material discharge device according to claim 1, wherein the insert member includes projections and recesses formed on and in a surface thereof extending in a lengthwise direction.

10. The liquid material discharge device according to claim 9, wherein the projections and the recesses are formed by a plurality of projected portions in contact with an inner peripheral surface of the liquid feed path and grooves positioned between the projected portions.

11. The liquid material discharge device according to claim 10, wherein the grooves positioned between the projected portions are formed by a spiral groove.

12. The liquid material discharge device according to claim 1, wherein the insert member includes a plurality of stirring blades arranged side by side in a lengthwise direction.

13. The liquid material discharge device according to claim 1, wherein at least a surface of the insert member is made of a material softer than an inner peripheral surface of the liquid feed path.

14. The liquid material discharge device according to claim 13, wherein at least the surface of the insert member is made of rubber or resin.

15. The liquid material discharge device according to claim 1, wherein the insert member is prepared as a plurality of insert members having different cross-sectional areas, and selected one of the insert members can be removably inserted into the liquid feed path.

16. The liquid material discharge device according to claim 1, wherein the discharge member is constituted by a plunger including a tip portion that is moved forward and backward in the liquid chamber, or by a screw including a tip portion that is rotated in the liquid chamber.

17. The liquid material discharge device according to claim 1, wherein the discharge member is a plunger extending vertically, the drive device is a drive device moving the discharge member forward and backward, and the discharge device is of jet type in which a liquid material is discharged in form of a flying droplet from the discharge port by colliding the forward-moving plunger against a valve seat that is formed in an inner bottom surface of the liquid chamber, or by stopping the forward-moving plunger just before the plunger is collided against the valve seat.

18. A liquid material discharge method using the liquid material discharge device according to claim 1.

19. A liquid material discharge method of discharging a liquid material containing filler by using the liquid material discharge device according to claim 12.

20. The liquid material discharge device according to claim 1, wherein the insert member includes an insert portion inserted into the liquid feed path, and a knob portion coupled to the insert portion.

21. The liquid material discharge device according to claim 20, wherein the insert member is removable from the liquid feed path by moving only the insert member along an axial direction of the liquid feed path.

* * * * *